D. A. GEE.
LEVEL.
APPLICATION FILED DEC. 19, 1911.
1,100,554.
Patented June 16, 1914.
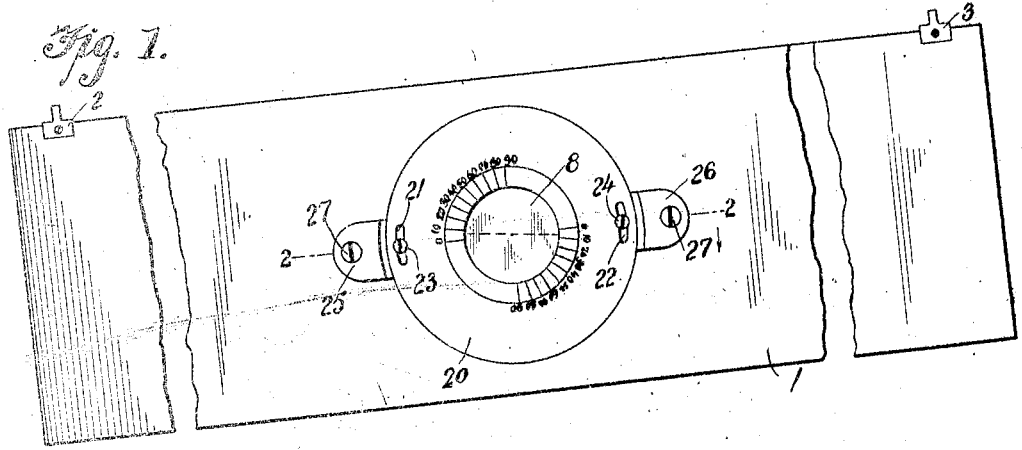
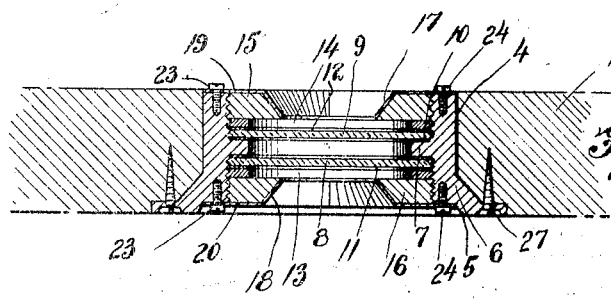
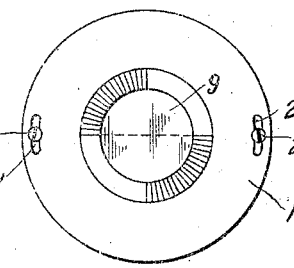 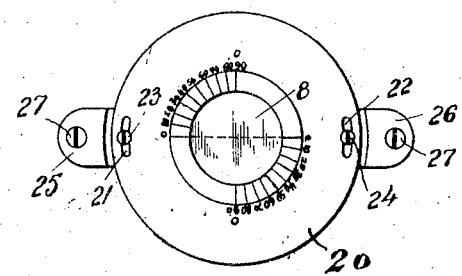
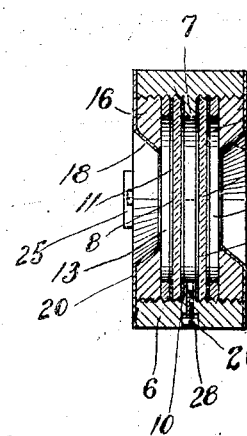
Witnesses
David Albert Gee, Inventor
By Victor J. Evans, Attorney

UNITED STATES PATENT OFFICE.

DAVID ALBERT GEE, OF PORTLAND, OREGON.

LEVEL.

1,100,554.

Specification of Letters Patent. Patented June 16, 1914.

Application filed December 19, 1911. Serial No. 666,647.

*To all whom it may concern:*

Be it known that I, DAVID ALBERT GEE, a citizen of the United States, residing at Portland, in the county of Multnomah and State of Oregon, have invented new and useful Improvements in Levels, of which the following is a specification.

This invention relates to improvements in spirit levels.

The object of the invention is to provide a level of this character which is simple in construction, which provides means whereby the evaporation of the liquid within the level may be compensated for by an adjusting element, which can be manufactured at a small cost, and which if desired may be applied to a degree instrument by simply attaching a pair of level sights to the body of the level.

I also aim to provide a level with a liquid containing box having a side opening provided with inclined walls, the said walls being graduated to mark the degrees of a circle upon one of the sides or faces of the box, and miter graduations upon the opposite face of the box, whereby the said degrees or graduations may be accurately determined according to the inclination of the level with relation to the level of the liquid within the box.

For the purpose of explaining the invention, the accompanying drawings illustrate a satisfactory reduction of the same device, but the important instrumentalities thereof may be varied, and it is to be understood that the invention is not limited to the specific arrangement and organization shown and described.

In the drawings, Figure 1 is a side elevation of a level constructed in accordance with the present invention and showing the same employed as a degree instrument. Fig. 2 is a central longitudinal sectional view taken upon the line 2—2 of Fig. 1. Fig. 3 is a view looking toward one of the faces of the level box. Fig. 4 is a view looking toward the opposite face of the same. Fig. 5 is a sectional view taken at a right-angle to that illustrated in Fig. 2.

Referring now to the drawings in detail the numeral 1 designates a rectangular member forming the body of the level. In the device illustrated in Fig. 1 of the drawings the said body has one of its longitudinal edges provided with a pair of level sights 2 and 3, in this instance the level is employed for surveying, and the level body is centrally provided with a circular opening 4 within which is an annular level box 5. The box 5 comprises a ring member 6, the same being centrally formed with an integrally provided inwardly extending angular flange 7.

The numerals 8 and 9 designate transparent plates, preferably glass, which are arranged adjacent the opposite faces of the flange 7. Interposed between the said plates and the flange are gaskets 10, the same comprising compressible rings of a width approximately equaling that of the flange 7. The numerals 11 and 12 designate similar gaskets which are arranged upon the outer faces of the transparent plates 8 and 9, and the said plates are normally sustained tightly against the gaskets and against the flange 7 through the medium of sustaining rings or washers 13 and 14. The bore of the ring member 6 is preferably threaded upon the opposite sides of its central flange 7, and the outer edges of the washers 13 and 14 are also preferably threaded to co-act with the threads of the said rings. The washers may be thus sustained in proper relation to the transparent plates 8 and 9 as well as to the gaskets for the plates. However, if desired other means may be employed with equal efficiency for securing the said washers to the ring or box 5.

The numerals 15 and 16 designate annular blocks each of which is provided with centrally flared or cone-shaped openings designated by the numerals 17 and 18. The outer edges of these blocks may be, and are preferably threaded to engage with the threads of the ring member 6 of the box to engage with the washers. The blocks 15 and 16 are preferably constructed of wood and are each provided upon their outer faces as well as upon their cone-shaped openings with metallic reinforcements or faces, designated by the numerals 19 and 20 respectively. The cone-shaped depressed portion of the facing of the block 16 is provided with graduations marking the degrees of a circle as clearly illustrated in Fig. 3 of the drawings. By reference to this figure it will be noted that these graduations are arranged upon the opposite quadrants of the circle provided by the annular cone-shaped depending portion of the face 19, so that the zero marks are arranged directly opposite each other when the level body is sustained in say a horizontal position.

The facing 20 has its annular cone-shaped depressed portion provided with miter graduations which are arranged in the diametrically opposite quadrants of the circle provided by the said cone-shaped member, as clearly shown in Figs. 1 and 4 of the drawings, the zero or horizontal and vertical marks are arranged diametrically opposite each other as in the case of the degrees of the circle heretofore described.

Each of the plates 18 and 19 is provided with oppositely arranged elongated concentric slots or openings 21 and 22, the same adapted to receive the threaded portions of headed elements 23 and 24, and the threads of the said elements are adapted to co-act with the threads provided in depressed openings or slots formed in the opposite faces of the ring member 6. The heads of the said elements are adapted to contact with the plates adjacent the edges provided by the concentric slots 21 and 22 so as to sustain the plates 19 and 20 in proper position upon the ring 6. By this arrangement it will be noted that either of the casings 19 or 20 may be rotated so as to regulate any inaccuracy which may occur through the rough usage of the level.

The ring 6 is preferably provided with oppositely disposed ears 25 and 26, the same having suitable openings, the outer portions of which are counter-sunk to provide for the reception of an ordinary securing element such as a screw 27, whereby the box 5 is retained upon the angular body 1. It is, of course, to be understood that the said body is provided with suitable depressions to receive the ears so that the ears will lie flush with the face of the body.

The body 1, as well as the collar and flange 7 thereof are provided with registering openings, the same being threaded for the reception of a screw member 28. The opening in the body has its outer portion either enlarged or flared to receive the head of the said screw member, so that the same will be sustained at all times below the surface of the edge of the level, and which at the same time provides for the entrance of a suitable instrument whereby the screw may be rotated in either direction. The screw 28 may have an outer facing 28' of compressible material which is adapted to serve as means for preventing the liquid within the liquid chamber from escaping between the threads of the screw and the threads of the collar of the body. This screw is of course removable and the liquid may be inserted within the chamber through the opening in the ring and body. The screw not only serves as means for closing the said openings but also for adjusting the liquid in the chamber, that is when the screw is turned in one direction it will force a certain quantity of liquid out of the openings and into the chamber so as to bring the level of the said liquid to register with the zero marks upon the box 5 or if a greater quantity of liquid than necessary is inserted within the chamber the screw will be rotated in the opposite direction, and the liquid will consequently fall as a portion thereof occupies the openings for the screw.

Having thus described the invention what I claim is:—

A level having its stock provided with a circular opening, a circular box removably secured within the opening, said box being centrally provided with an integrally formed inwardly extending annular flange, the inner wall of the box to the opposite sides of the said flange being threaded, transparent plates within the box, gaskets engaging the outer faces of the plates, block members comprising threaded rings provided with cone-shaped openings engaging with the threads of the box to compress the gaskets against the transparent plates, metallic graduated face plates for the blocks and adjustably connected with the rings, the box having a threaded opening which passes through its annular flange, and a screw engaging with the threads of the opening to normally close the said opening.

In testimony whereof I affix my signature in presence of two witnesses.

BERT GEE.

Witnesses:
  CHAS. F. DUNN,
  F. L. BLANCHARD.